United States Patent [19]

Dianitsch

[11] Patent Number: 4,924,245
[45] Date of Patent: May 8, 1990

[54] RESILIENT NOSE PAD FOR SPECTACLES
[75] Inventor: Franz Dianitsch, Leonding, Austria
[73] Assignee: Optyl Eyewear Fashion International Corporation, Norwood, N.J.
[21] Appl. No.: 199,316
[22] Filed: May 26, 1988
[51] Int. Cl.$^5$ .............................................. G02C 5/12
[52] U.S. Cl. .................................. 351/136; 351/137; 351/76
[58] Field of Search ...................... 351/71, 74, 76, 136, 351/137

[56] References Cited
U.S. PATENT DOCUMENTS
750,392 1/1904 Dixley .................................. 351/76

Primary Examiner—P. M. Dzierzynski
Attorney, Agent, or Firm—Fitch, Even, Tabin & Flannery

[57] ABSTRACT

An eyeglass assembly includes a pair of lenses with surrounding lens frames interconnected by bridges joining the lens frames together and cooperating therewith to form an opening for receiving a portion of the wearer's nose. Support means are provided on each lens frame below the bridge for engaging the wearer's nose for additional support. The nose supports include first and second legs formed from a unitary strip of resilient material bent at its mid-portion so that the two legs extend in generally the same direction from an intermediate fold portion. The two legs are resiliently movable toward and away from each other, and a first leg is joined to the lens frame so as to be resiliently movable with respect thereto. The legs may extend in generally upward or downward directions, that is, generally toward and away from the bridge member. The second legs are located adjacent the nose-receiving opening and carry nose-engaging surfaces. In one embodiment, third legs are resiliently joined to the second legs by a fold portion. When the nose supports are compressed, the third leg contacts the first leg to provide an additional point of resilient deflection as the third leg and second leg are compressed toward each other. The nose supports readily conform to a wide variety of nose configurations and sizes, providing an automatic fitting relative thereto.

23 Claims, 3 Drawing Sheets

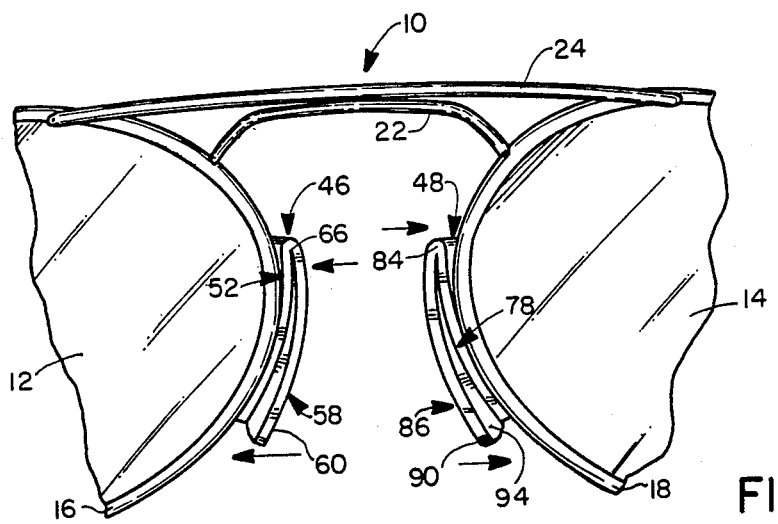
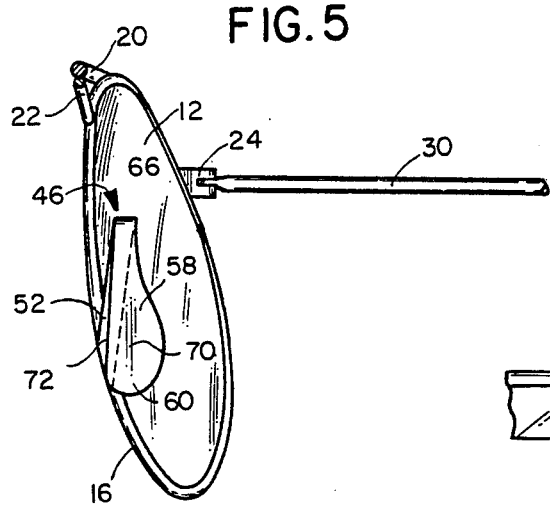
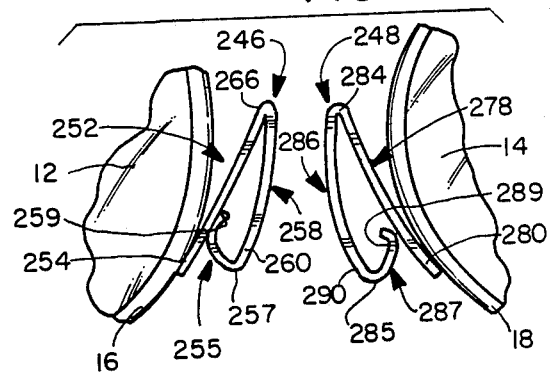
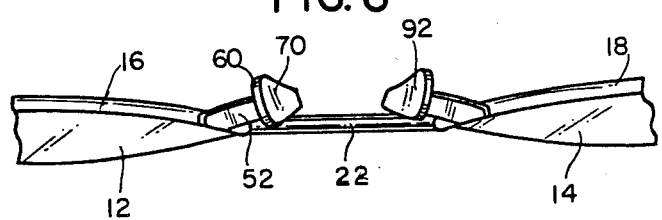
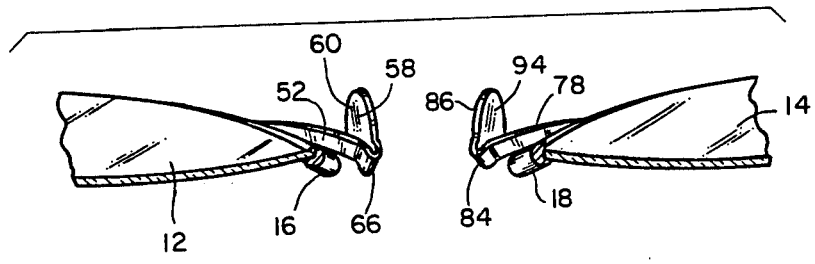

RESILIENT NOSE PAD FOR SPECTACLES

BACKGROUND OF THE INVENTION

1. Field of the Invention

The invention pertains to nose pads of spectacles or eyeglasses.

2. Brief Description of the Prior Art

A manufacturer of eyeglass frames, in order to compete effectively, must be able to provide eyeglasses at the lowest possible cost. As will be appreciated by those familiar with the distribution of consumer products, considerable cost savings can be realized if the number of different models in a given product line can be reduced.

Eyeglass frames vary in style to present a pleasing, aesthetic appearance, and thus a variety of different eyeglass models are provided for this reason. However, a manufacturer of eyeglass frames must also account for the distribution or range in size and proportions of the facial and anatomical features of the eyeglass market to which he is appealing. Because there is considerable variety in facial structure among the inhabitants of even the smaller localities and regions, a manufacturer of eyeglass frames must supply eyeglasses of different fitting sizes based, for example, upon the distance between the patient's eyes. Many eyeglass frames in use today have a simple, nonadjustable nose pad. For example, eyeglasses having molded eyeglass frames surrounding the lenses have rigid nose pads integrally molded therewith, and thus eyeglass frames for a particular eye spacing are relied upon to provide adequate support for a variety of individuals having different size and proportioned noses and more particularly, nose bridges, on which the eyeglasses rest.

The nose pads of a pair of eyeglasses are relied upon to maintain the desired alignment between the optical lenses and the patient's eyes. Although this alignment is not particularly crucial for plano lenses such as sunglasses, safety glasses or the like, this arrangement is particularly important for multifocal lenses. Apart from considerations of comfort during periods of extended wearing, eyeglasses should not vary widely in their wearing position relative to the wearer's eyes. Shifts in the position of eyeglass lenses will require a wearer to refocus or readjust his head when viewing an object at a fixed location. However, wearers of eyeglasses will readily appreciate that perspiration, humid or moist environments, and facial oil frequently cause the nose pads of an eyeglass frame to slip, thus bringing the eyeglasses lenses out of their desired position.

Turning now to issues of wearing comfort, many wearers have little fatty tissue at the bridge of their nose, and thus have a relatively low tolerance to the amount of pressure applied to the bridge of the nose by the eyeglass pads. Accordingly, it is desirable to reduce the pressure on the wearer's nose as much as is possible, and the best technique for achieving this goal is to increase the contact area between the nose pad and the wearer's nose to the greatest extent.

However, as has been outlined above, this goal is difficult to achieve if the eyeglass frames are not adjustable in their nose pad configurations, and where a single nose pad design must accommodate different wearers having a variety of nose configurations. U.S. Pat. No. 4,142,784 sought to relieve these problems by providing snap-in nose pieces of resilient material, such as a soft resilient plastic or the like. Several problems are, however, realized with this type of nose pad construction. For example, the nose pads must typically be quite bulky in appearance, and are thus objectionable for aesthetic reasons. Further, resilient plastic material, especially when exposed to the ultraviolet content of sunlight undergoes an aging process which reduces the material's resilience. Also, the properties of plastics materials vary significantly with temperature changes, especially colder temperatures, and the effects are more pronounced for plastics components of greater thicknesses.

U.S. Pat. No. 3,584,939, which provides a soft resilient arch overfitting the central bridge portion of an eyeglass frame, suffers from these same drawbacks, and accordingly a need remains for improved resilient nose support.

SUMMARY OF THE INVENTION

It is an object of the present invention to provide a resilient nose support for eyeglasses which are automatically adjustable for the size of a wearer's nose and also for the differing configurations and particularly the angular sides of the wearer's nose bridge.

Another object of the present invention is to provide a resilient nose support for eyeglasses which remains relatively unaffected by temperature and exposure to ultraviolet light, remaining pliable so as to maintain a maximal surface area contact with the bridge of a wearer's nose.

A further object of the present invention is to provide a resilient nose support of the above-described type which is simply and economically formed from a minimum number of inexpensive parts and which is aesthetically pleasing in appearance.

These and other objects of the present invention which will become apparent from studying the appended description and accompanying drawings are provided in an eyeglass assembly including:

a pair of lenses;

a lens frame surrounding at least a portion of each lens to provide support therefor;

bridge means connecting the lens frames together and cooperating with the lens frames to define an opening for receiving a portion of a wearer's nose;

support means associated with on each lens frame below the bridge for engaging the wearer's nose so as to support the eyeglass assembly therefrom, the support means including first and second legs joined end-to-end;

the first leg proximate the eyeglass frame having opposed resilient end portions, a first of which is mounted to the lens frame so as to be resiliently movable toward and away therefrom; and the second leg proximate the nose-receiving opening having a contact surface for engaging a wearer's nose and including means for mounting to the second end of the first leg so as to be resiliently movable toward and away therefrom, whereby the second leg is movable toward and away from a wearer's nose with the resilient deflection of both the first and said second legs.

In another embodiment of an eyeglass assembly according to the present invention, the nose support disposed on each lens frame includes three leg portions, preferably formed by bending a unitary strip of resilient sheet material. For example, the three leg portions may be formed from a sheet of resilient plastic material which has been blanked to form a unitary strip. The strip is folded at two bent portions to form a first leg at one end of the strip, a second leg at the intermediate portion, and a third leg at an opposite end of the strip. The first leg has an end joined to the lens frame, surrounding the eyeglass frame so as to provide support therefor. The second leg, joined to the first leg through a first bend portion, bends away from the eyeglass frame toward the nose-receiving opening formed between the lens frames and a bridge member connecting the lens frames. The remaining leg of the second leg is joined through a second bend portion to a third remaining leg having a free end located adjacent the lens frame. The free end of the third leg may optionally include a camming surface for camming the first leg when the nose support is compressed. The first bend portion provides a resilient deflection between the first and second legs as the legs are compressed together, and the second bend portion provides a resilient force as the second and third legs are compressed together. If desired, the resilient forces of both bend portions may operate simultaneously during a compression of the nose pad to provide a wide range of forces developed within the nose pad.

Whether two or three leg portions are provided for a given nose pad, the nose pad is, according to one aspect of the present invention, characterized by a compound resilient deflection.

BRIEF DESCRIPTION OF THE DRAWINGS

In the drawings, wherein like elements are referenced alike,

FIG. 4 is a fragmentary view similar to that of FIGS. 2 and 3 but showing the upper portions of the nose pads deflected away from each other;

FIG. 5 is a fragmentary cross-sectional elevational view taken along the line 5—5 of FIG. 2;

FIG. 6 is a fragmentary bottom plan view of FIG. 2 looking in the direction of arrow 6—6;

FIG. 7 is a fragmentary plan view, taken in cross section along the line 7—7 of FIG. 2;

FIG. 12 shows a third embodiment of the present invention.

DESCRIPTION OF THE PREFERRED EMBODIMENT

Figure 1:
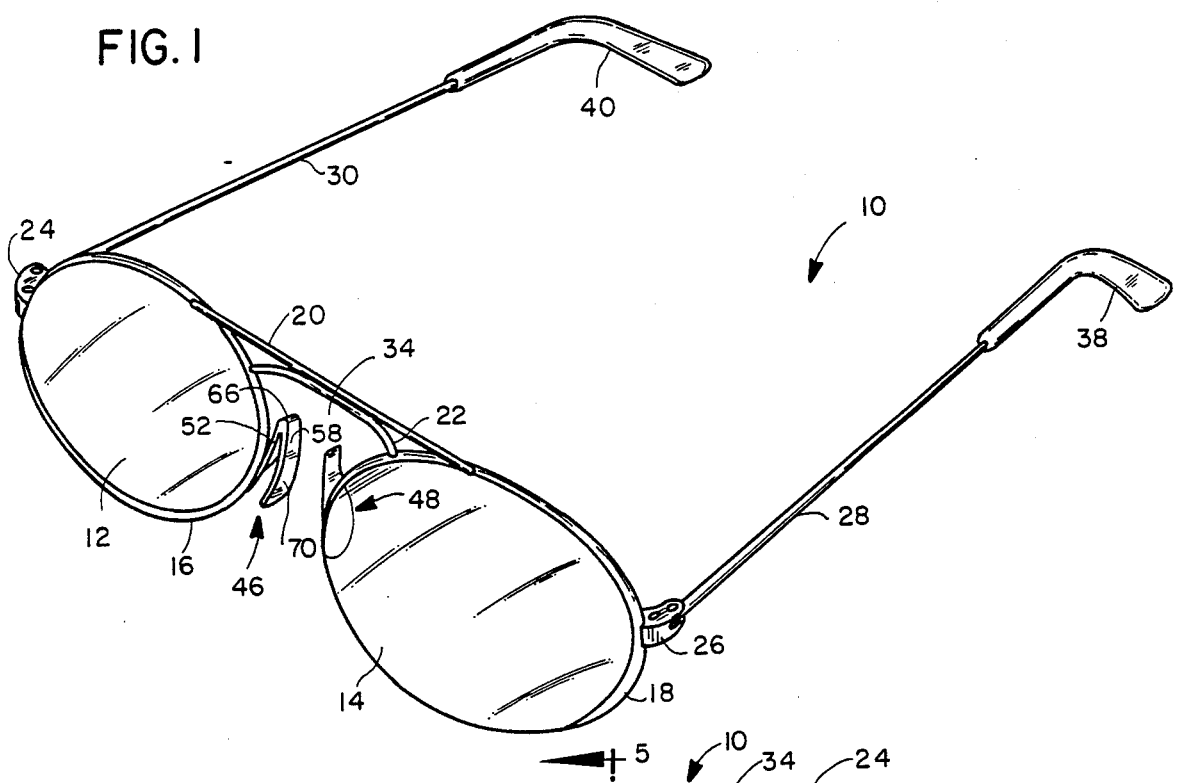
FIG. 1 is a perspective view of the eyeglasses embodying aspects of the present invention.

Turning now to the drawings and especially to FIG. 1, a first embodiment of eyeglasses illustrating aspects of the present invention is generally indicated at 10. Eyeglasses 10 include a pair of lenses 12, 14 of conventional construction. A pair of lens frames 16, 18 surround the outer periphery of the lenses 12, 14 to provide, in cooperation with remaining portions of the eyeglass frames, support for the lenses in their proper position with respect to the wearer's eyes. The eyeglass frame further includes bridge means connecting the lens frames together, and including horizontal bridging members 20, 22. The bridging members 20, 22 of the preferred embodiment and the lens frames 16, 18 are preferably formed from metal wire material with the ends of the bridging members joined to the lens frames by welding or other suitable joining means. Hinge members 24, 26 are joined to the laterally outer portions of the lens frames, and include pivotal mounting for temple pieces 28, 30.

The bridge members 20, 22 cooperate with the lens frames 16, 18 to provide an opening 34 for receiving portions of a wearer's nose. The temple pieces 28, 30 have ear-engaging ends 38, 40 which support rear portions of spectacles 10 in the customary manner. The weight of the lenses and the majority of the weight of the eyeglass frames applies a downward pressure on the wearer's nose, which comprises the third point of support for the eyeglasses. In order to reduce the wearer's discomfort, nose pads are sometimes secured to the lens frames, below the bridge means. However, as explained above, several important advantages can be attained if portions of the eyeglasses engaging the wearer's nose are made resilient so as to be movable toward and away from each other so that a single nose pad construction can accommodate noses of different sizes and shapes. According to one aspect of the present invention, multi-leaflet nose pads are provided to obtain these advantages.

The nose pad supports constructed according to the present invention are generally indicated at 46, 48, one nose pad support joined to each lens frame at a point below the bridge members 20, 22. The nose pads 46, 48 are disposed so as to intrude slightly into the nose-receiving opening 34. The nose pad 46 includes a first leg or leaflet 52 proximate the lens frame 16 and having a first end 54 joined thereto by any suitable means. For example, when the lens frame 16 is made of plastic, the leaflet 52 is preferably integrally molded with the lens frame or is a separate plastic part joined thereto with a suitable adhesive. When the lens frame 16 is made of metal, the leaflet 52 is, preferably, also made of metal of the same or a different type and the first end 54 thereof is joined to the lens frame by a metallurgical bond such as welding or by using an adhesive. It is generally preferred that the leaflet 52 be formed of resilient material or that at least the end portion 54 thereof, when joined to the lens frame 16, be resiliently movable toward and away therefrom.

The nose pad support 46 further includes a second leg or leaflet 58 having a lower free end 60 and an upper end 62 joined to the upper end 64 of leaflet 52 by a resilient hinge 66. Because of the resilient hinge 66, the second leaflet 58 is resiliently movable toward and away from the first leaflet 52 as well as the lens frame 16.

The leaflets 52, 58 can be separately formed from one another and subsequently joined together at their upper ends by a resilient or a non-resilient hinge. If the upper end portions 64, 62 of the leaflets 52, 58 are resilient, their joinder at 66 will result in the same resilient construction as where the upper ends 64, 62 of the leaflets are made of relatively inflexible material, but are joined together by a flexible resilient material at 66. When the lens frames 16 are made of metal, and it is desirable to have metal leaflets 52, 58, it may be desirable to form the leaflets separately and to join them together with a resilient plastic at 66 to provide the desired resilient displacement of the leaflet 58. In a similar manner, the leaflet 52 would also be of a relatively inflexible material joined together with lens frame 16 with a resilient plastic, for example.

However, it is generally preferred for reasons of economical construction that the leaflets 52, 58 be formed from a single unitary strip of resilient material. For example, where the lens frames 16 are made of plastic, the nose pad support 46 is preferably formed by stamping a sheet of resilient plastic to form a unitary strip member of elongate cross-section which is thereafter bent at its mid-portion to form a resilient hinge 66. Similarly, when the lens frame 16 is made of metal and it is desirable to have a metal nose pad support 46, and the nose pad support can be stamped from an integral sheet of spring metal material which is thereafter bent at its mid-portion to form the resilient hinge 66.

In the preferred embodiment, the nose pad 46 is made of resilient plastic material and secured to the lens frame 16 with a suitable adhesive, although sonic welding or other suitable types of joinder could also be used. It is desirable, before bending the unitary strip to form the two leaflet portions 52, 58, that the leaflet 58 be further formed so as to have a convex surface 70 (see FIG. 1) facing toward the opening 34 so as to contact the wearer's nose. Referring to FIG. 5, the preferred form of leaflet 52 is that of an elongated relatively narrow rectangular strip joined to lens frame 16 so as to extend at a slight angle in the rearward direction, toward the wearer's face.

Compared to the first leaflet 52, the second leaflet 58 is considerably larger, having a greatly enlarged bulbous portion adjacent its free end 60. The bulbous portion, as indicated, includes the convex, nose-engaging surface 70. Although the first leaflet 52 is inclined rearwardly toward the wearer's face, it is generally preferred that the forward edge 72 of leaflet 58 be generally vertical in its orientation. As will be pointed out in greater detail below, the nose pad 46 is resiliently deflectable, and according to one aspect of the present invention, finds resilient deflection in both leaflets 52, 58. This feature, combined with the rearward offset of the leaflets, provides a comfortable fit and assures that the leaflets will be free-moving so as to provide a fast initial response when fitted to a wearer's face. As a result, an initial comfortable contact with the bridge of the wearer's nose is made, and provides a comfortable fit throughout even extended periods of time and despite movement and change in orientation of the wearer's head.

The other nose pad support 48 is substantially identical to the nose pad support 52, being generally a mirror image thereof taken about a central plane of the eyeglasses located midway between the lenses 12, 14. Accordingly, the nose pad support 48 includes a first leg or leaflet 78 having a first end 80 joined to lens frame 18 with a suitable securement. The remaining, upper end 82 of leaflet 78 is joined through a resilient hinge 84 to a second leaflet 86 located proximate the wearer's nose. The leaflet 86 has an upper end 88 adjacent the hinge 84 and has an opposed free end 90. Leaflet 86 has a convex surface 92 facing the opening 34 (see FIG. 6) and contacting the wearer's nose when the eyeglasses are being worn. It is generally preferred that the leaflet 86 have a substantially constant thickness and accordingly the reverse major surface 94 of the leaflet is generally concave. As with the leaflet 58 of the nose pad 46, leaflet 86 has a generally bulbous free end portion significantly enlarged relative to the leaflet 78. The leaflet 86 is preferably resiliently deflectable toward and away from the leaflet 78, the leaflet 78 in turn being resiliently deflectable toward and away from the lens frame 18.

When the lens frame 18 is formed of plastic, it is generally preferred that the leaflets 78, 86 be formed from an integral blank of resilient plastic material, and that any forming operations necessary to produce the convex nose-engaging surface 92 be performed on the blank strip. Thereafter, the strip is folded at its mid-portion to form the resilient hinge 84. In the preferred embodiment, the upper portions 82, 88 of the leaflets are resilient, and and the hinge portion 84 is also resilient, so that the leaflet 86 is resiliently movable toward and away from the leaflet 78.

If the end portion 80 of leaflet 78 were integrally formed with the lens frame 18, the point of joinder could incorporate a resilient hinge and without more, provide the desired resilient deflection of the nose pad support 48. However, if the leaflet were joined with an adhesive or other inflexible joinder to lens frame 18, it is important that the leaflet 78 or at least its end portion 80 be formed of resilient material to ensure that the leaflet 78 and accordingly the entire nose pad support 48, be resiliently movable toward and away from lens frame 18.

Figure 2:
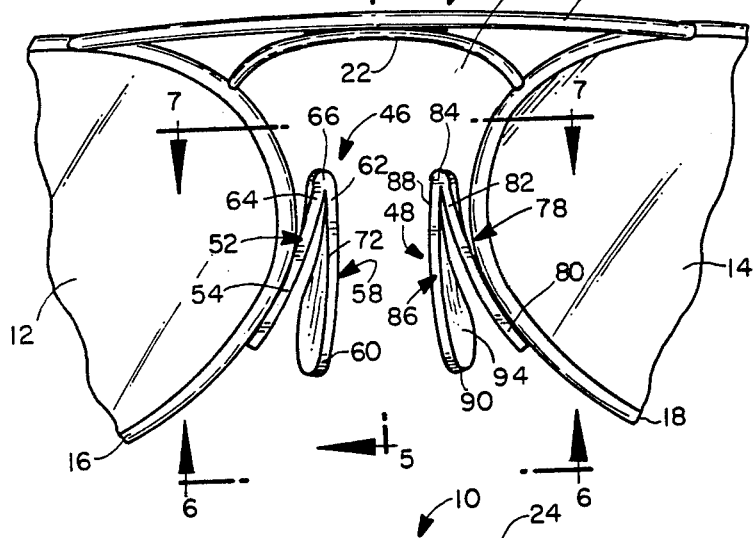
FIG. 2 is a fragmentary elevational view of the eyeglasses of FIG. 1, taken on an enlarged scale, and showing the resilient nose pads in a rest configuration.
Figure 3:
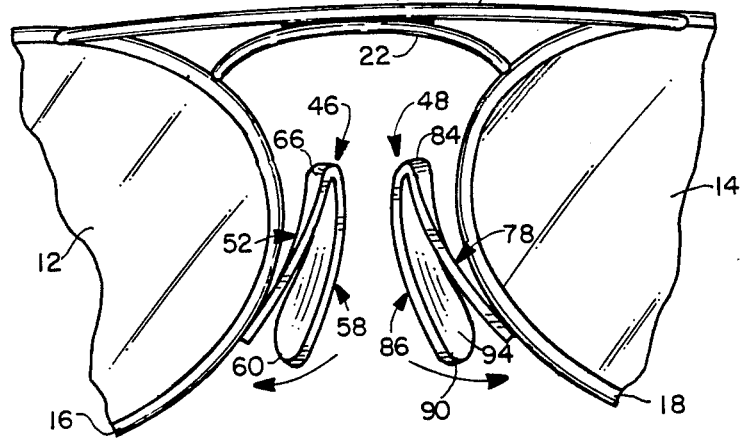
FIG. 3 is a fragmentary view similar to that of FIG. 2 but showing the bottom portions of the nose pads deflected away from each other.
Figure 8:
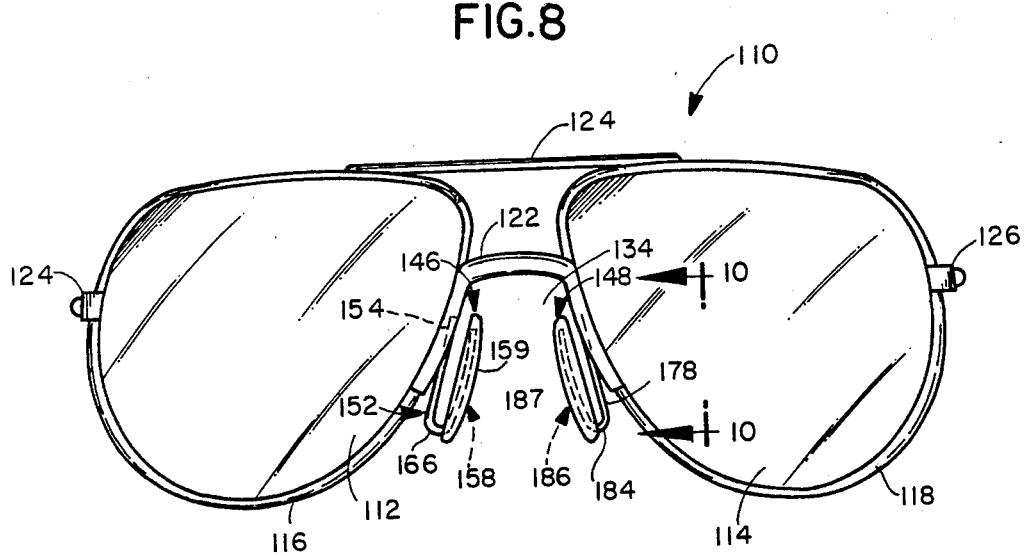
FIG. 8 is a front elevational view of eyeglasses having an alternative embodiment of resilient nose pads according to aspects of the present invention.
Figure 9:
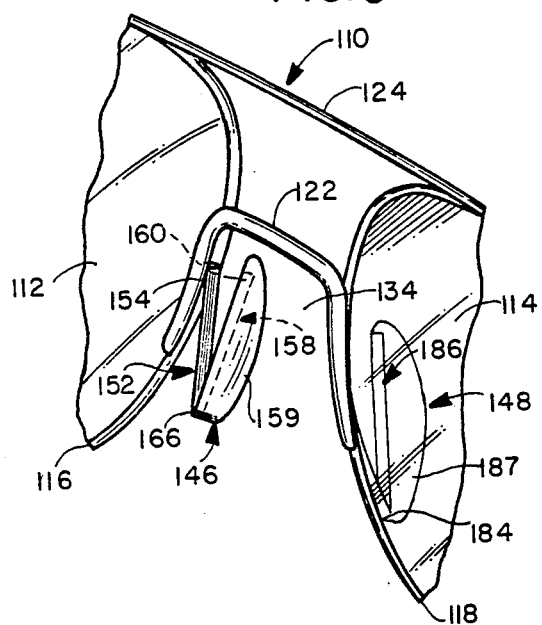
FIG. 9 is a fragmentary perspective view looking from the front of the eyeglasses of FIG. 8.

Referring now to FIGS. 2-4, the compound resilient deflection of the first embodiment of nose pad support means according to aspects of the present invention will be described. Nose pad supports, as illustrated in FIG. 2, assume a rest configuration with the first leaflet 52 spaced apart from the lens frame 16 and the second leaflet 58 spaced apart from the first leaflet 52. In particular, the hinge or fold portion 66 of the left nose pad support and the fold portion 84 of the right nose pad support are spaced from the lens frames as the second legs 58, 86, and particularly the free ends 60, 90 thereof, are deflected towards their respective lens frames, as illustrated in FIG. 3. FIG. 3 shows an outward deflection force tending to separate the lower free end portions of the nose pads away from each other, emphasizing the resilient mounting between the inner leaflets 58, 86 and their respective outer leaflets 52, 87, respectively. The deflection indicated in FIG. 3 will tend to compress the leaflets of a nose support pad toward each other.

FIG. 4 shows a second type of deflection wherein outward forces are applied to the upper ends of the nose pads, tending to deflect the upper portions of the nose pads toward the lens frames, thus emphasizing the resilient deflection of the outer leaflets 52, 78 toward their respective lens frames 16, 18. The different types of deflection of FIGS. 3 and 4 are, generally speaking, idealized for purposes of a simplified description. It will be appreciated however that in actual use the deflections of FIGS. 3 and 4 will occur simultaneously in varying degrees during both an initial fitting of the eyeglasses to a wearer's face and thereafter, during a time of continued wearing.

Referring now to FIGS. 8-11, a second embodiment of eyeglasses illustrating other aspects of the present invention will be described. The second embodiment of the eyeglasses is indicated generally at 110, and includes lenses 112, 114 surrounded by lens frames 116, 118 which extend to hinge members 124, 126, respectively. Ear-engaging pieces are connected to the hinges in a conventional manner, so as to support the eyeglasses about the ears of a wearer. The lens frames are joined together by upper and lower bridge members 124, 122, respectively. The bridge members cooperate with the lens frames to form a nose-receiving opening 134. Nose pad supports generally indicated at 146, 148 are positioned on either side of the opening 134 and, as will be seen, engage a wearer's nose to provide further points of support for the eyeglasses. The left-hand support includes first and second legs or leaflets generally indicated at 152, 158, respectively. A fold portion 166 joins the leaflets together and is located remote from the bridge members 122, 124, so that the leaflets 152, 158 extend generally in the same direction toward the bridge members. The remaining ends 154, 160 are accordingly located adjacent the bridge members.

The right-hand nose support, generally indicated at 148, includes first and second leaflets 178, 186 joined together at a fold portion 184. Opposite the fold portion 184, the remaining ends 180, 190 lie adjacent the bridge members, with the fold portion located remote from the bridge members. The first leaflet 178 is located proximate the lens frame, whereas the second leaflet 186 is located remote from the lens frame, adjacent to the nose-receiving opening 134.

The leaflets of the nose pads are preferably formed from unitary strips of resilient sheet material. The preferred embodiment of the eyeglasses 110 includes metallic lens frames 116, 118. Accordingly, it is most convenient in the preferred embodiment to provide leaflets 152, 158 blanked from an integral sheet of resilient spring metal material. After blanking, the strip is folded about its mid-portion to form the fold portion 166, thereby joining the leaflets 152, 158 together with a resilient spring mounting. The remaining end 154 of spring leaflet 152 is joined to the lens frame 116 with a metallurgical bond such as welding, brazing, or the like. Alternatively, the remaining end 154 of leaflet 152 may be joined to the lens frame using adhesive. When the lens frames are made of plastic material, leaflets of resilient metal may be used, but it has been found most convenient to fabricate the leaflets from a sheet of resilient plastic material. After bending the blanked strip at the fold portion 166, the first leaflet 152 is joined at its remaining end 154 to the lens frame 116, using a thermal bond such as thermal welding or the like, or an adhesive may be used.

Figure 10:
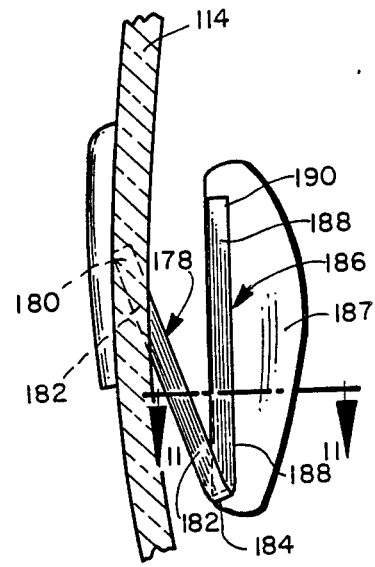
FIG. 10 is a fragmentary cross-sectional view taken along the line 10—10 of FIG. 8.
Figure 11:
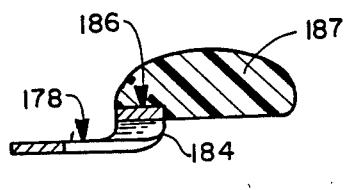
FIG. 11 is a fragmentary cross-sectional view taken along the line 11—11 of FIG. 10.

The remaining nose support 148 is similarly formed, having first and second leaflets 178, 186, located adjacent the lens frame and the nose-receiving opening, respectively. As indicated most clearly in FIG. 10, the legs 178, 186 have a generally straight-line configuration. The leaflets 178, 186 are preferably formed from a unitary strip of resilient sheet material such as metal, in the preferred embodiment where the lens frames are also formed of metal. A fold portion 184 in the medial portion of the strip disposes the leaflets to extend from the fold portion in generally the same direction. As indicated in FIG. 10, for example, the leaflets 186, 178 are formed such that the major surfaces of the leaflets are generally parallel to each other, being separated from each other by a distance corresponding generally to the width of the major face of the leaflets, as illustrated in the cross-sectional view of FIG. 1. The fragmentary view of FIG. 10 is taken from a direction generally normal to the major faces of the leaflets, and as apparent from that viewpoint, the leaflets are offset from one another by an acute angle, such that the remaining ends 180, 190 of the leaflets are spaced apart from one another.

The second leaflets 158, 186 have exterior surfaces generally opposing each other, facing toward the exterior surfaces of a bridge of a wearer's nose. The second leaflets 158, 186 can, if desired, have a rounded, generally convex, nose-contacting surface as described above with reference to the preceding FIGS. 1–7. However, it has been found convenient to provide nose pads 159, 187, which are separately formed and subsequently secured by adhesive or the like joinder to the second leaflets 158, 186. In the preferred embodiment, the nose pads extend throughout the entire length of the second leaflets and have end portions extending therebeyond. Other arrangements are, of course, possible. For example, the nose pads can be replaced by a relatively thin coating disposed on the major surface of the second leaflet, and the second leaflet can, if desired, have an enlarged width or generally bulbous configuration.

As clearly indicated in FIG. 10, the first and second leaflets of the nose supports, while extending in generally the same direction, do not overlie each other, and thus the second leaflets of the nose pads are afforded an unobstructed range of motion, as they are deflected toward the lens frame. As mentioned above, the first leaflets of the nose supports are formed of resilient material and are attached to the lens frame so as to form a generally acute angle therewith. Although the joinder of the first leaflets to the lens frames in the preferred metal material embodiment are joined with a relatively inflexible joinder, i.e., a metallurgical bond such as welding, brazing or the like, the second leaflets are resiliently deflectable with respect to the lens frames. This deflection is a first degree of freedom, or a first range of motion of the nose pads as the eyeglasses are fitted to and are worn by a wearer.

The fold portion 166 is formed in a sheet of resilient material and provides a resilient deflection between the first and second leaflets, which comprises a second degree of freedom or a second range of motion of the nose supports, whereby the remaining ends 160, 190 of the second leaflets are resiliently deflectable toward and away from the lens frames. A resilient deflection of the first leaflets toward and away from the lens frames is also provided, but in a manner somewhat different from that described above with respect to the embodiment of FIGS. 1–7. For wedging forces applied to the lower ends of the nose supports, the first leaflets of the nose supports are resiliently deflected toward the lens frames. However, when wedging forces are applied to the upper ends of the nose supports, i.e., in a direction tending to separate the upper ends of the nose supports, the first leaflets are deflected, albeit slightly, away from the lens frames, with the bending about the fold portions being in part resolved by a deflection of the fold portions toward each other. The diverging, non-overlapping arrangement of the nose support leaflets, as illustrated in FIG. 10, contributes to this latter convergence of the fold portions upon application of a wedging or separating force applied to the upper ends of the nose pads. These degrees of freedom or ranges of motions of the nose pads as described have been idealized for purposes of illustration, it being appreciated that in a practical application, a combination or compounding of the above-described deflections occurs, as the eyeglasses are initially fitted to the wearer's nose and as the eyeglasses, once installed, are adjusted about the wearer's face.

Referring now to FIG. 12, a third alternative embodiment of a nose support constructed according to the present invention, is illustrated. FIG. 12 is a fragmentary view of eyeglasses similar to the eyeglasses glasses 10 of FIGS. 1-7. Except for the alternative construction of the nose supports thereof, indicated generally at 246, 248, the embodiment of FIG. 12 is substantially identical to the eyeglasses 10 described above and includes, for example, lenses 12, 14 at least partially surrounded by lens frames 16, 18. The lens frames are joined together by bridge members in a manner described above with reference to FIGS. 2 and 3. The nose support 246, for example, is preferably formed from a unitary strip of resilient plastic sheet material. Plastic material is chosen because the preferred embodiment of eyeglasses 10 uses plastic lens frames 16, 18, and accordingly, plastic is chosen for the nose supports for the ease of fabrication in joining the nose supports to the lens frame. However, other materials may be chosen for the nose supports. For example, the nose supports may be blanked and formed from sheets of resilient spring metal material. The nose support 246 has first and second leaflets 252, 258 joined together by a fold portion 266. The first and second leaflets 252, 258 are substantially identical to the first and second leaflets 52, 58 illustrated in FIG. 3. The nose support 246 differs however in the addition of a third leaflet 255 joined to the remaining end 260 of second leaflet 258 by a reentrant or reverse bend 257. The third leaflet 255 has a bent camming end 259.

The right-hand nose support 248 has a similar construction, and includes first and second leaflets 278, 286 joined together by a fold portion 284. A reentrant or reverse bend 285 joins the remaining end 290 of the second leaflet 286 to a third leaflet 287. The third leaflet 287 has a free camming end 289 which, in the rest configuration, contacts or is located immediately adjacent the remaining end 280 of the first leaflet 278.

In operation, when a wedging or spreading force is applied to the upper ends of the nose supports adjacent the fold portions 266, 284, the first leaflets 252, 278 are resiliently deflected toward the lens frames 16, 18, and the third leaflets 255, 285 are deflected away from the first leaflets 252, 278. When a wedging or spreading force is applied to lower portions of the nose supports, the third leaflets 255, 287, are brought into contact with, and upon further deflection, cam against the remaining ends 254, 280 of the first leaflets 252, 278, respectively.

Depending upon the relative resilience of the bend portions at the upper and lower ends of the nose supports, the first leaflets of the nose supports may also undergo a resilient outward deflection, away from the lens frames 16, 18. It is possible that three different resilient forces are compounded upon a compression of each nose support. In addition to the resilient bending of the first leaflets and the resilient bending of the first and second leaflets about the third portions 266, 284, a resilient bending of the second, lower fold portions 257, 285 also occurs. In general, the camming action of the third leaflets across the remaining ends of the first leaflets as the third leaflet and second leaflets are pressed together is preferably friction-free.

The nose supports constructed according to the principles of the present invention accommodate a wide variety of nose sizes and shapes. Because of their compound resilient deflection, the nose pads according to the present invention automatically conform to the wearer's nose and provide a comfortable fit, even during periods of extended wear. Further, the nose-engaging surfaces or the nose pads (when provided) can have an outer coating which is relatively supple and has a desired coefficient of friction so as to maintain a fixed location of the nose pads relative to the wearer's nose, so as to prevent slipping of the eyeglasses, despite orientation of the wearer's or movements of the wearer's head. The nose supports according to the present invention can be readily fabricated using inexpensive materials and can be formed to have a pleasing, aesthestic appearance, complementing the remaining portions of the eyeglass construction. It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. An eyeglass assembly comprising: a pair of lenses, each having a peripheral edge,
    a frame means including first and second lens frames each having a first portion at least partially surrounding said lenses, in contact with the peripheral edge thereof to provide support therefor,
    a bridge means on the frame means connecting the first and second lens frames together,
    a pair of nose support means connected to the frame means for engaging the nose of the wearer,
    each of said nose support means comprising inner and outer elongated legs, both having longitudinal axes, with the longitudinal axis of the outer leg lying in a plane formed by the adjacent lens or a plane generally thereto, and both legs having a strip-like configuration with elongated cross-sections, said inner and said outer legs having first and second ends, with the second end of the inner leg positioned proximate the wearer's nose and the second end of the outer leg located proximate a lens,
    said legs being flexible and being joined together at first ends so that the inner leg is flexible relative to the outer leg,
    said legs being flexible relative to each other and the outer leg being flexible relative to said frame portion to which it is joined so as to provide a compound motion when fitted on the nose of the wearer.

2. An eyeglass assembly in accordance with claim 1 in which the legs are formed from a bent metal strip and said legs extend generally in the same direction from an integral bend at the juncture of the first ends of the legs, said first leg flexing about the bent strip.

3. An eyeglass assembly in accordance with claim 1 in which the inner and outer legs each extend downwardly from their common juncture.

4. An eyeglass assembly in accordance with claim 1 in which the inner and outer legs each extend upwardly from their common juncture.

5. An eyeglass assembly including:
    a pair of lenses, each having a peripheral edge,
    a lens frame surrounding at least a portion of each lens, in contact with the peripheral edge thereof, to provide support therefor;

bridge means connecting the lens frames together and cooperating with the lens frames to define an opening for receiving a portion of a wearer's nose;

support means associated with each lens frame below the bridge for engaging the wearer's nose so as to support the eyeglass assembly therefrom, the support means including first and second legs of resilient strip-like configuration having an elongate cross-section, the first and second legs being joined end-to-end and said legs having longitudinal axes which lie in a plane formed by the adjacent lens or a plane generally parallel thereto;

the first leg proximate the eyeglass frame having opposed first and second end portions, a first of which is mounted to the lens frame so as to be resiliently movable toward and away therefrom; and the second leg proximate the nose-receiving opening with a contact surface for engaging a wearer's nose and the second leg including means for mounting to the second end portion of the first leg, said legs being flexible relative to each other and the first leg being flexible relative to said lens frame to which it is joined, whereby the second leg is movable toward and away from a wearer's nose with the resilient deflection of both said first and said second legs.

6. The eyeglass assembly of claim 5 wherein the second leg has a free end, and the eyeglass assembly includes nose-engaging pads carried at the free end.

7. The eyeglass assembly of claim 5 wherein the first and second legs comprise portions of a resilient unitary strip of elongate cross-section joined at a fold line so as to create a resilient bias force between the portions of the strip, one portion comprising the first leg and the other portion comprising the second leg.

8. The eyeglass assembly of claim 5 wherein the first leg extends away from the bridge so that the second leg has an upper free end.

9. The eyeglass assembly of claim 5 wherein the first leg extends toward the bridge so that the second leg has a lower free end.

10. The eyeglass assembly of claim 5 wherein the resilient material comprises a plastic strip and the portion thereof comprising the second leg has an enlarged generally convex nose-engaging surface.

11. The eyeglass assembly of claim 5 wherein the resilient material comprises a spring metal strip and the portion thereof comprising the second leg has a free end; and
said eyeglass assembly further including a nose-engaging pad member attached to the second leg free end.

12. The eyeglass assembly of claim 11 wherein the nose-engaging pad has upper and lower portions, and the legs of the spring metal strip are angularly offset one from the other so as to avoid overlying one another when compressed together such that, when the upper portion of the nose pads are deflected away from each other, the bends of the metal strips are deflected toward one another.

13. An eyeglass assembly including:
a pair of lenses, each having a peripheral edge;
lens frames surrounding portions of each lens, in contact with the peripheral edge thereof to provide support therefor;
at least one bridge member connecting the lens frames together and cooperating with the lens frames to define an opening for receiving a portion of a wearer's nose;

support means associated with each lens frame below the bridge member for supporting the eye glass assembly when contacting the wearer's nose, comprising a unitary strip of resilient material having an elongated cross-section and bent at its mid-portion to form first and second legs extending in generally the same direction from an intermediate fold portion so as to be resiliently movable toward and away from each other, the first and second legs having longitudinal axes which lie in a plane formed by the adjacent lens or a plane generally parallel thereto, with the first leg located proximate the eyeglass frame and having a free end joined thereto, with the first leg resiliently movable toward and away from the eyeglass frame, and the second leg carrying a nose-engaging surface remote from the fold portion, so that both legs associated with each lens frame are resiliently movable with respect to each other and with respect to the eyeglass frame when the eyeglasses are fitted to a wearer's face and the nose-contacting surfaces are placed in contact with the wearer's nose.

14. The eyeglass assembly of claim 13 wherein the legs of each support means extend generally toward the bridge member with remaining ends located adjacent thereto, with the fold portion located remote from the bridge member.

15. The eyeglass assembly of claim 14 wherein the legs are formed from a unitary strip of resilient plastic material and the remaining end of the first leg is joined to the lens frame by thermal bonding means.

16. The eyeglass assembly of claim 13 wherein the legs of each support means extend generally away from the bridge member with the fold portion located adjacent the bridge member, and with remaining ends of the legs located remote from the bridge member.

17. The eyeglass assembly of claim 16 further comprising a pad attached to the second leg of each support means having an outwardly facing nose-engaging surface.

18. The eyeglass assembly of claim 16 wherein the legs are formed from a unitary resilient strip of metal, and the remaining end of the first leg is joined to the lens frame with a metallurgical bond.

19. The eyeglass assembly of claim 16 wherein the legs are formed from a unitary strip of resilient plastic material and the remaining end of the first leg is joined to the lens frame with an adhesive.

20. The eyeglass assembly of claim 16 wherein the second leg has an enlarged, generally bulbous free end with a generally convex nose-engaging surface.

21. The eyeglass assembly of claim 13 wherein each leg is elongated, with the strip being bent so that the longitudinal axes of a pair of legs are offset by an acute angle so that when folded toward each other, the longitudinal axes of the legs are spaced apart from each other at the end of the legs.

22. The eyeglass assembly of claim 13 further comprising a third leg joined to the remaining end of said second leg by another fold portion, so as to be resiliently movable toward and away from the second leg, the other fold portion comprising a reverse bend such that the third leg extends generally toward said first leg.

23. The eyeglass assembly of claim 22 wherein said third leg includes a free camming end having a surface for camming engagement with the remaining end of said first leg.

* * * * *

UNITED STATES PATENT AND TRADEMARK OFFICE
CERTIFICATE OF CORRECTION

PATENT NO. : 4,924,245
DATED : May 8, 1990
INVENTOR(S) : Franz Dianitsch

It is certified that error appears in the above-identified patent and that said Letters Patent is hereby corrected as shown below:

In the title, "References Cited", change "Dixley" to read --Pixley--.

In column 9, line 6, delete the word "glasses".

IN THE CLAIMS:

In Claim 1, column 10, line 38, after the word "generally" insert the word --parallel--.

Signed and Sealed this

Thirteenth Day of August, 1991

Attest:

HARRY F. MANBECK, JR.

*Attesting Officer*    *Commissioner of Patents and Trademarks*